United States Patent [19]

Fish

[11] Patent Number: 5,142,227
[45] Date of Patent: Aug. 25, 1992

[54] METHOD AND APPARATUS FOR MEASURING STRAIN WITHIN A FERROMAGNETIC MATERIAL BY SENSING CHANGE IN COERCIVE FIELD

[75] Inventor: Gordon E. Fish, Verona, N.J.
[73] Assignee: Allied-Signal Inc., Morristownship, Morris County, N.J.
[21] Appl. No.: 533,242
[22] Filed: Jun. 4, 1990
[51] Int. Cl.$^5$ .......................... G01B 7/24; G01L 1/12; G01R 33/14; G01R 33/18
[52] U.S. Cl. ....................................... 324/209; 73/779; 73/862.69; 324/223
[58] Field of Search ...................... 324/209, 222, 223; 73/779, 862.36, 862.69

[56] References Cited

U.S. PATENT DOCUMENTS

| | | | |
|---|---|---|---|
| 4,449,095 | 5/1984 | Steingroever et al. | 324/223 |
| 4,623,841 | 11/1986 | Stinson et al. | 324/223 |
| 4,931,729 | 6/1990 | Pratt | 324/209 |
| 4,931,730 | 6/1990 | Olsen et al. | 324/209 |

FOREIGN PATENT DOCUMENTS

| | | | |
|---|---|---|---|
| 28293 | 4/1973 | Japan | 324/209 |
| 56-101527 | 8/1981 | Japan. | |
| 0767574 | 9/1980 | U.S.S.R. | 324/209 |
| 0442441 | 2/1936 | United Kingdom | 324/209 |

OTHER PUBLICATIONS

Mohri et al.; Sensitive Force Transducers Using a Single Amorphous Core Multivibrator Bridge; IEEE Trans. on Magnetics, vol. MAG-15, No. 6, Nov. 1979, pp. 1806–1808.

Goto et al., J. Appl. Phys., 52, 1914–16 (1981), "Effect of tension on coercive force in amorphous $(Fe_{1-x}Co)_{7.7}Si_{10}B_{13}$ribbons".

Ferro et al., IEEE Trans. Magn., MAG-7, 230-32 (1971), "On the Effect of Strain on the Coercive Force of Some Fe-Ni Alloys . . . ".

*Primary Examiner*—Gerard R. Strecker
*Attorney, Agent, or Firm*—Ernest D. Buff; Gerhard H. Fuchs

[57] ABSTRACT

Strain within a substrate is measured by attaching thereto a magnetic circuit comprising a magnetostrictive, soft ferromagnetic element, and sensing a change in the coercive field of the element caused by strain therewith.

1 Claim, 5 Drawing Sheets

METHOD AND APPARATUS FOR MEASURING STRAIN WITHIN A FERROMAGNETIC MATERIAL BY SENSING CHANGE IN COERCIVE FIELD

BACKGROUND OF THE INVENTION

This invention relates to a method and apparatus for measuring strain within a ferromagnetic material. More Particularly, this invention relates to a method and apparatus for measuring the change in coercive field of certain magnetostrictive, soft ferromagnetic materials as a result of their being subjected to externally applied stress.

DESCRIPTION OF THE PRIOR ART

In order to determine critical design parameters within various types of test elements or components within a machine or structure the designer must be able to accurately measure the stress (or strain) which the component may be subjected to under operating conditions. One method of measuring stress within a component is by the attachment of a strain gage to the component surface. Once calibrated, the strain gage can be used to determine the stresses within the component when the component is subjected to a load. Another method for non-destructive direct measurement of stress within a component made up of a ferromagnetic material, is based upon the attenuation of a magnetic pulse as it traverses the component.

Present strain gages, which are adapted to be attached to a substrate, operate on the principle that when a wire or foil is stretched the electrical resistance within the wire or foil changes due to the increase in length and decrease in diameter of the wire. Thus, by measuring the change in resistance of the wire or foil and referencing this change in resistance to a calibration of the strain gage, the stress or strain within the substrate onto which the strain gage is attached may be determined. The advantages of a resistance strain gage include relatively simple design and construction and easy attachment to the surface of any type of material. However, since the resistance within the wire or foil is also a function of the temperature to which the strain gage is subjected, as well as to other environmental factors, the resistance type off strain gage is temperature limited and requires a complex functional algorithm in order to determine stress or strain within a material under varied or changing environments. Additionally, resistance strain gages provide a signal which is measured as a change in resistance, thus this signal is inherently analog in nature.

The other method of measuring stress, as disclosed within Japanese Patent No. 56-101,527 issued to Y. Sougiyou, measures stress applied to a body by the attenuation of a magnetic flux within a detection piece made of a magnetic elastic material which is under stress. The stress is detected as a variation in the magnitude of the magnetic flux, which is measured by the amount of current produced within a detecting coil. This method of measuring stress also provides an analog output signal.

The effect of tension on coercivity of certain FeCoBSi amorphous ribbons is reported by Goto et al. (J. Appl. Phys. 52, 1914–1916 (1981). The coercivity of alloys with composition $(Fe_{1-x}\ Co_x)_{77}Si_{10}B_{13}$ is disclosed to increase upon application of tensile stress. No disclosure is made, however, of the use of this variation to sense strain or stress in a substrate. The effect on coercive force (i.e., coercive field) of FeNi alloys with 51 and 72 percent Ni as a function of plastic strain is disclosed by Ferro et al. (IEEE Trans. Magn, MAG-7, 230–232 (1971) The effect is considered in samples which are plastically deformed. By definition, samples which are plastically deformed do not recover their initial metallurgical state upon removal of the stress to which they are subjected. No disclosure is made by Ferro et al. of the use of the variation of coercive force as a measure of stress or strain in a substrate. Furthermore, Ferro et al. teach that in some Ni-Fe alloys the coercive force exhibits a complicated behavior as a function of deformation, first increasing, then decreasing.

SUMMARY OF THE INVENTION

It is an object of the present invention to provide a strain gage which operates on the principle that the coercive field, or more simply, coercivity, of certain magnetostrictive, soft ferromagnetic materials changes as a function of stress applied to those materials. Such a strain gage may be attached or affixed to a substrate and by suitable calibration, may be used to sense the strain characterizing substrate.

A further object of the present invention is to provide a strain gage which can operate at elevated temperatures including temperatures approaching the Curie point of a ferromagnetic material used within the strain gage.

A further object of the present invention is to provide means of measuring strain as a discrete change in the time at which a voltage pulse is induced in a pickup coil by change in the magnetic state of a sensing element caused by application of stress, thus providing a signal particularly adapted for use with digital signal processing and analyzing circuitry.

A further object of the present invention is to provide means of measuring strain within a substrate without requiring wires or electrical connection between the substrate and external signal processing equipment.

BRIEF DESCRIPTION OF THE DRAWINGS

The invention will be more fully understood and further advantages will become apparent when reference is made to the following detailed description and the accompanying drawings, in which.

DESCRIPTION OF THE PREFERRED EMBODIMENT

Figure 1:
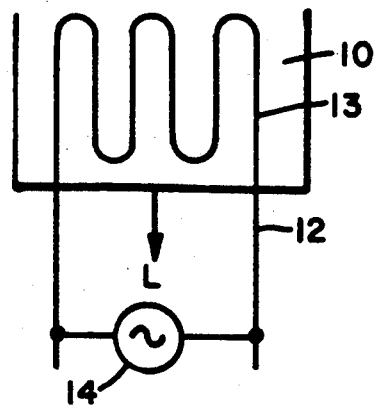
FIG. 1 is a schematic diagram of a prior art resistance type strain gage.

Referring now to the figures, FIG. 1 is an illustration of a common resistance type of strain gage 10, having a wire element 12 including a strain measuring section 13 adapted to be attached to the surface of a component. An ohm meter 14, connected to wire element 12 at opposite ends of strain measuring section 13, is used to measure the change in the resistance of the wire element 12 as a load L is applied. The resistance type strain gage 10 produces an analog signal output indicative of the stress within the component.

Figure 2:
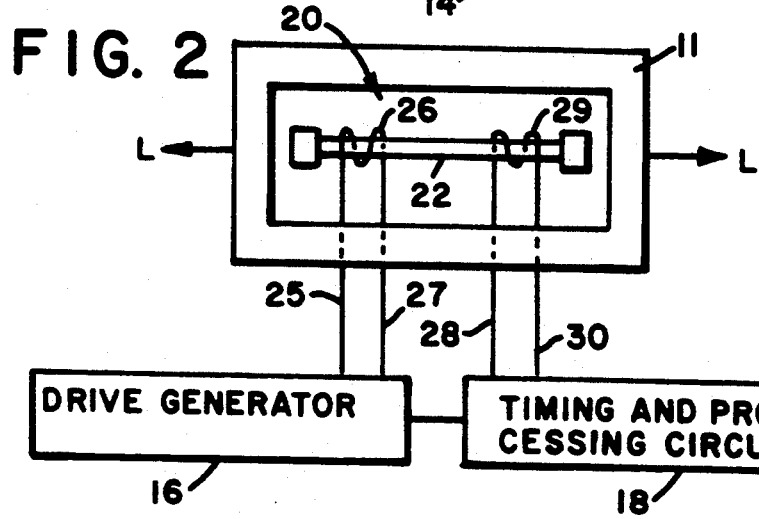
FIG. 2 is a schematic diagram of a magnetic strain gage of the invention having a simply-connected, magnetostrictive, soft ferromagnetic element.

By comparison, FIGS. 2 through 9 show embodiments of the magnetic strain gage of the present invention. Within FIGS. 2 through 9 the same numbers will be used to identify common elements. FIG. 2 shows a magnetic strain gage 20 and the associated electronic circuitry. Strain gage 20 is attached to the surface of a substrate 11. For simplicity, some of the electronic circuitry shown in FIG. 2 will not be repeated in FIGS. 3-9. The magnetic strain gage 20 includes a magnetostrictive, soft ferromagnetic element 22, which may be, for example, a wire, a ribbon, or a thin film of magnetostrictive, soft ferromagnetic material and is preferably a wire, a ribbon, or a thin film of amorphous metal. A drive coil 26 proximate to magnetostrictive, soft ferromagnetic element 22 and preferably encircling element 22 is connected by drive coil leads 25 and 27 to a drive generator 16. The drive generator 16 routes a periodically changing electric current through drive coil 26, causing a changing magnetic flux within magnetostrictive, soft ferromagnetic element 22, thereby initiating a change in the state of magnetization within magnetostrictive, soft ferromagnetic element 22. A receiving or sense coil 29, also proximate to magnetostrictive, soft ferromagnetic element 22 and preferably encircling element 22, is connected via receiving coil leads 28 and 30 to timing and processing circuitry 18, shown schematically. The timing and processing circuitry 18 is also connected to the drive generator 16. When the drive generator 16 imposes a magnetomotive force on magnetostrictive, soft ferromagnetic element 22 through drive coil 26, a digital counter within the timing and processing circuitry 18 is started. As the magnetic domains flip in element 22 proximate to receiving coil 29, an electrical voltage is generated within receiving coil 29, due to the changing magnetic flux. This electric voltage in receiving coil 29 is detected by the timing and processing circuitry 18, and the digital counter provides a digital output measurement of the strain induced within substrate 11 by an applied load L.

Figure 5:
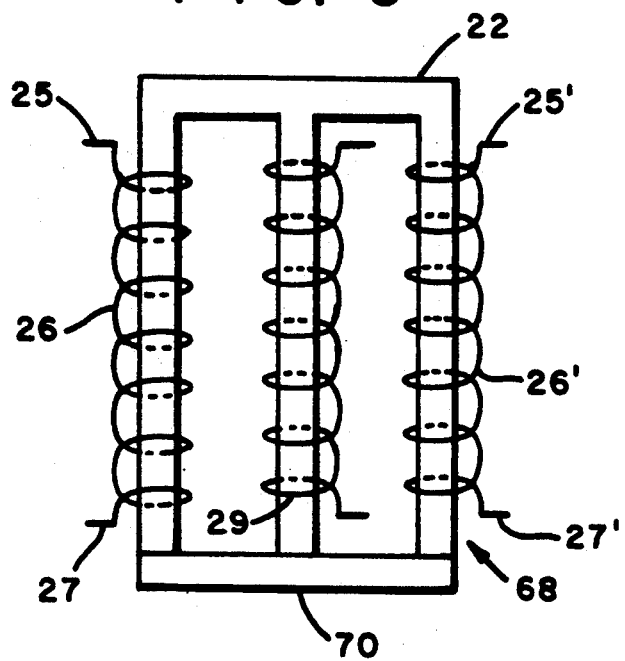
FIG. 5 is a schematic diagram of a magnetic strain gage of the invention having a magnetostrictive, soft ferromagnetic element and a soft ferromagnetic flux closure element.
Figure 10:
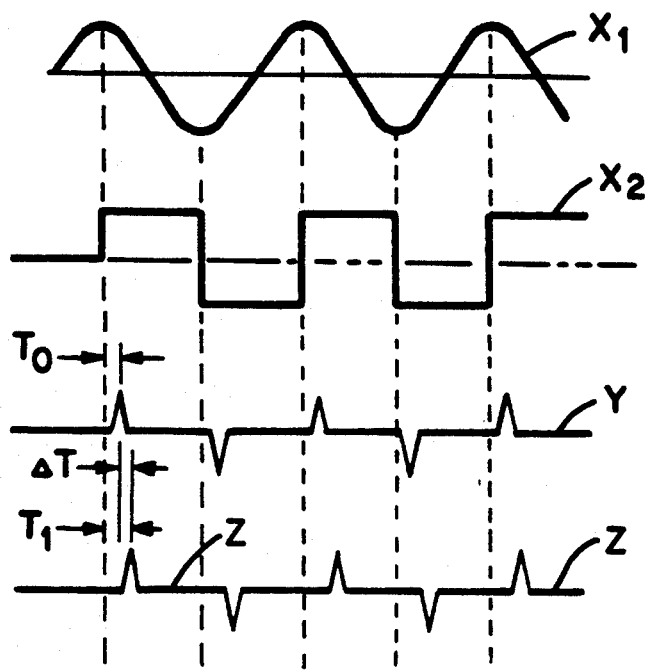
FIG. 10 is a graph illustrating the input and output pulses of the magnetic strain gage of FIGS. 2-9.

In operation, the drive generator 16 of FIG. 2 sends an electric current to drive coil 26, thereby producing a changing magnetic field around drive coil 26 initiating the reversal of the magnetization of the magnetization within element 22. Simultaneously with the initiation of the magnetic pulse, the digital counter within timing and processing circuitry 18 is turned on. As the magnetic domains within element 22 flip proximate to the receiving coil 29, the changing magnetic flux causes receiving coil 29 to produce an output voltage pulse. This output voltage pulse is sent to the timing and processing circuitry 18 and stops the digital counter. The time interval captured within the timing and processing circuitry 18 is retained and provides the digital output signal. FIG. 10 diagrammatically illustrates this sequence. The top two lines $X_1$, $X_2$ in FIG. 10 illustrate the electric current waveform generated by the drive generator 16 of FIG. 2 as shown. This may be either a sinusoidal wave $X_1$ or a square wave $X_2$. The line Y of FIG. 5 shows the output voltage pulse wave induced by the flipping magnetic domains proximate to receiving coil 29 when element 22 is not under stress. There is a discrete time interval $T_0$ between the time at which the electric current pulses $X_1$ or $X_2$ of the top lines initiate the magnetization reversal and the time at which the rate of change of magnetization in element 22 is maximal, coincident with the voltage peaks of wave form Y. The bottom line Z of FIG. 10 shows the effect of strain within the element 22 and illustrates the increase in the discrete time interval to $T_1$ between when the electric current pulses in drive coil 26 couple enough magnetic force to flip the magnetic domains within element 22 and induce a voltage pulse within receiving coil 29. The time differential $\Delta T$ between $T_0$ and $T_1$, as shown by the differences between the pulses on the line Y and the bottom line Z, is used as the measurement of the strain within the element 22, and hence $\Delta T$ can be used to determine the strain within substrate 11 to which the element 22 is attached. Various methods for fabricating the strain gage of the invention are disclosed in applicants co-pending application Ser. No. 136,268 filed Dec. 22, 1987, which is incorporated herein by reference.

Figure 11:
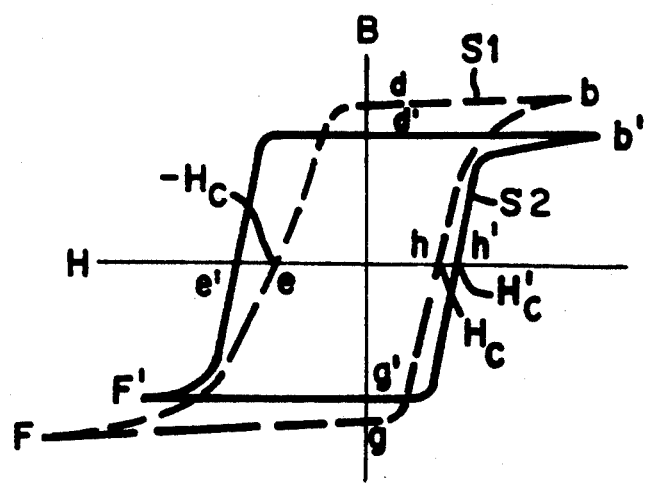
FIG. 11 is a hysteresis curve for a ferromagnetic material showing the effect of applied stress.

The change in magnetization force (H) which is required to initiate the domain reversals in element 22 may best be understood with reference to the microscopic properties of ferromagnetic materials, and the magnetic hysteresis curves as shown in FIG. 11, wherein the H axis represents the magnetizing force and the B axis represents the flux density. B and H are further related to the internal magnetization M of the material by the relation $B = H + 4M \pi$. Within ferromagnetic materials, (also sometimes referred to as simply, magnetic materials), there is a coupling between the internal magnetization of the material (a vector quantity) and the mechanical state of the material, which reflects, inter alia, any stresses applied to the material. A variety of associated phenomena are known as magnetostriction. If the magnetization direction within a magnetic sample is changed then the sample undergoes changes in its physical dimensions. For example, if a magnetic material is taken from an initial state, in which its magnetization is randomly distributed, to a final state, in which its magnetization is entirely directed along a given direction, then the sample's length along that direction changes by a fractional amount known as the saturation magnetostriction ($\lambda_s$). The value of $\lambda_s$ can be either positive or negative; typical magnitudes of $\lambda_s$ for the transition metals (Fe, Ni, and Co) are of the order $-10$ to 50 parts per million (ppm); for rare earth-transition metal alloys, $\lambda_s$ can be as large as 2000 ppm. $\lambda_s$ provides a measure of the strength of the magnetoelastic coupling.

For materials having non-zero values of $\lambda_s$, the application of a uniaxial stress $\sigma$ gives rise to a magnetoelastic anisotropy energy per unit volume $K_s = \sigma \lambda_s \cos^2 \theta$ where $\theta$ is the angle between the axis of the stress and the magnetization direction is determined by an energy balance among the various sources of magnetic anisotropy and the dipolar energy M·H, where H is the applied field and M is the magnetization. In addition to magnetoelastic anisotropy, there are other sources of anisotropy: magnetocrystalline anisotropy, shape anisotropy, and field induced anisotropy. For materials having $\lambda_s > 0$ which are placed in tension, the magnetoelastic anisotropy contribution makes it energetically favorable for the magnetization to align with the tensile axis. For application in magnetic strain gages, the greatest linearity is presumed to be achieved by selection of materials in which the magnetoelastic contributions to the total anisotropy energy dominates the contributions from the magnetocrystalline and field-induced anisotropy energies. For sensitivity at low strain levels, it is preferred that the magnetic material have low magnetocrystalline and field-induced anisotropy. This requirement is normally satisfied by so-called soft magnetic materials, i.e. those having low values of magnetic coercive field $H_c$.

Suitable magnetic materials for the present invention are soft magnetic materials which are magnetostrictive, preferably those having $\lambda_s > 10$ ppm. A preferred class of magnetic materials to be employed in the present invention is the class of magnetic amorphous metals, which are also known as glassy metals or metallic glasses. Such materials exhibit metallic electrical and thermal conductivity, and x-ray diffraction patterns like those of oxide glasses, having broad halos instead of the sharp peaks seen in crystalline materials. Among the magnetic amorphous metals are materials having the general formulas $M_aY_bZ_c$ and $M_dY_e$, which are disclosed by U.S. Pat. No. 3,856,513 issued to Chen et al. A variety of techniques are know in the art for producing these materials in the form of wires, ribbons, and thin films. In general, the materials are formed by rapidly quenching the alloy from the melt at rates of at least $10^{4\circ}$ C./s, and more preferably, of at least $10^{6\circ}$ C./s. Alternatively, the materials are formed by atomistic deposition processes such as evaporation and sputtering.

Ferromagnetic amorphous metals exhibit a desirable combination of negligible magnetocrystalline anisotropy, low magnetic coercivity, and high hardness and tensile strength. The high strength and hardness are especially valuable for the present application. Most conventional crystalline soft magnetic materials which have low anisotropy also have low hardness and tensile strength. They are thus prone to plastic deformation at comparatively low strain levels. In contrast, many amorphous materials show a reversible stress-strain behavior at up to 100 ksi stress. Suitable amorphous materials are thus useful for application in strain gages requiring a stable, reproducible zero strain state and high upper strain limit.

The present strain gage should employ a material having positive magnetostriction as its sensing element for use in measuring tensile strains, and a negative magnetostriction sensing element for compressive strains. Metallic glasses comprising Co as their sole transition metal are examples of negative magnetostriction materials.

The magnetic strain gage and method of the present invention may also be practiced using a magnetostrictive, soft ferromagnetic element composed of nanocrystalline alloy. Nanocrystalline alloys are distinguished by microstructures having a substantial fraction of grain sizes below about 100 nm, a size smaller than the grain sizes of metal alloys produced by conventional means, which are typically at least 1 $\mu$m and can be as large as several $\mu$m. A representative class of nanocrystalline alloys has the composition $(Fe_{1-x}T_x)_{100-a-b-c-d}Cu_aM_bB_cSi_d$, where a, b, c, and de are in atom percent, T is Ni and/or Co, M is at least one member selected from the group consisting of Nb, W, Ta, Zr, Hf, Ti, and Mo, $0 < x < 0.5$, $0.1 < a < 3$, $0.1 < b < 30$, $0.1 < c$ 25, $0 < d$ 30, and $5 < c + d < 30$. Such materials may be prepared as nanocrystalline alloys by devitrification of parent materials which are substantially fully amorphous (metallic glasses). During a suitable heat treatment, a fraction of the starting material is transformed from the amorphous state to a microstructure with crystalline particles having an average grain size of 100 nm or less. Certain nanocrystalline alloys obtained by devitrifying metallic glasses exhibit attractive soft magnetic properties. It is preferred that the nanocrystalline alloy for use in the present invention have a saturation magnetostriction greater than about 3 ppm and preferably at least 5-10 ppm. Nanocrystalline alloys of the composition disclosed above have Curie temperatures in excess of about 500° C., values much higher than those of most Fe-based metallic glasses. Thus, nanocrystalline materials are advantageously employed using the method and apparatus disclosed herein for strain measurement applications at elevated temperatures.

A ferromagnet is composed of an assemblage of spontaneously magnetized regions called domains. Within each domain, the elementary atomic magnetic moments are essentially aligned resulting in each domain acting as a small magnet. An unmagnetized foil of ferromagnetic material is composed of numerous domains oriented so that the total magnetization is zero. The process of magnetization under an applied field H, consists of growth of those domains oriented most nearly with the direction of the applied field H, at the expense of other domains which are randomly aligned, followed by rotation of the direction of magnetization within the non-aligned domains against anisotropy forces. On removal of the applied field H, some magnetization will remain. Under an applied magnetizing force H, domain growth proceeds by movement of the Bloch walls delimiting each domain. This takes place reversibly at first, then irreversibly, until the magnetic coercive force is reached. The irreversible nature of magnetization causes the reverse magnetization under an applied of opposite direction field (or sign) not to retrace the original magnetization path. Under the influence of a strong reverse magnetizing field $-H$, the magnetic orientations of the domains may be made to rapidly change alignment, i.e. to flip into alignment with the $-H$ field. The irreversibility of the magnetization also results in hysteresis, that is, a lag behind the applied field and the magnetization which, when ploted graphically, results in a hysteresis loop as shown in FIG. 11. The magnetic strain gage provides an apparatus for measuring the time required to flip the alignment of the magnetic domains. i.e. to measure the lag time or the increase in magnetization energy.

The magnetic strain gage may be operated at very high temperatures since the magnetic properties of ferromagnetic materials are relatively stable up to the Curie temperature $T_c$, about which a ferromagnet changes into a paramagnet. Thus, the present invention may be used at temperatures approaching the Curie temperature. By way of example, the Curie temperature of iron is 1043 K. (1418° F.).

The hysteresis curves of FIG. 11 are shown as representing the magnetic hysteresis loop for ferromagnetic material. In the case of an amorphous iron-based alloy the hysteresis loop is characterized as having a steep slope at its intersection with the H axis. The curve indicated by S1, i.e. bdefghb, is an example of the hysteresis loop for an amorphous metal which is not under any stress or strain, and which for example, would produce the output pulse as illustrated by the center line Y of FIG. 10. Curve S2, i.e. b'd'e'f'h'b', shows a hysteresis loop for the same amorphous iron-based alloy iron when a strain is applied to the alloy, and which would produce the output pulse illustrated by the bottom line Z of FIG. 10. Since the highest slopes on the B-H loop exist at the intersection of the H axis, it is at this point that dB/dt, which is proportional to the induced voltage, is maximum, causing the sharp output pulses of both polarities produced within the receiving coil 29.

As discussed above, strain causes a change in the magnetic behavior of magnetostrictive material, which results in the distortion of the hysteresis loop under an applied strain. This distortion generally causes an increase in the width of the hysteresis loop with reference to the H axis. Within the hysteresis loops, for curve S1, $H_c$ and for curve S2, $H_c'$, represent the magnetizing force at the positive crossing point for curves S1 and S2 on the H axis. The change between curve S1 and S2 as a function of applied stress or strain is related to the change in magnetization force required to produce a change in the flux density B in element 22 when element 22 is under a no-load condition and when element 22 is subjected to a stress load. This generally is the phenomenon upon which the magnetic strain gage shown in FIGS. 2-9 of the present invention is based.

It is generally found that the B-H loop of a soft ferromagnetic material is steepest at the points where the loop crosses the H-axis, i.e., at the coercive points at which $H=+-H_c$. If H is varied periodically in time so as to traverse the entire B-H loop smoothly, then the waveform of the time rate of change of B (i.e., the wave form of dB/dt) will exhibit peaks of positive and negative polarities at those times at which H attains values of the plus and minus the coercive field $H_c$, respectively. The wave form of dB/dt can easily be detected by measuring the voltage induced in a sensing coil encircling the magnetic material. By Faraday's law of induction, the instantaneous induced voltage is directly proportional to the instantaneous dB/dt. It is convenient to choose a cyclic, alternating waveform for the field H(t) in which the slope of H(t) changes only twice per period. Suitable choices for H(t) include sine, triangular, and sawtooth waveforms. H(t) is conveniently applied by causing an electrical current having the waveform desired to pass through a winding encircling the magnetic material, since instantaneous current and field are proportional. H(t) may be applied continuously or in a burst of a finite number of cycles. The latter is preferred when it is desired to limit the heat produced by joule heating of the current-carrying windings. A time-varying magnetic field may also be applied to a magnetic element by moving the element relative to a permanent magnet. This technique is useful in certain specialized applications of the invention, as in torque sensors.

The electric current generated by drive generator 16 of FIG. 2 should be of sufficient magnitude to produce a magnetomotive force which results in a peak field with strength sufficient to saturate the magnetization within element 22. It is presently believed that all of the magnetic domains in the element 22 tend to orientate or flip simultaneously, with only small local variations. Increasing the stress within element 22 increases the field strength (H) required to flip or realign the magnetic domains in the directions of H. This realignment must follow the hysteresis loop, which, as has been described, changes with an applied stress or strain. The time required for the magnetic domains to flip is directly linked to the distortion of the hysteresis loop since H is coupled to element 22 as a function of time. In effect the magnetic strain gage measures the increase in time necessary to supply the additional magnetizing force to produce a maximum percentage of magnetic domain realignments.

It may be appreciated that although the electric current pulse (FIG. 10 lines $X_1$ or $X_2$) is driven between a positive and a negative state at a regular interval, the timing of the pulse induced within receiving coil 29 is somewhat dependent on the magnetic properties of the ferromagnetic material used for element 22 and whether the magnetic field is applied in a positive or negative direction. Thus, there may be a time difference between when the positive $T_0$ pulse is received. Again referring to FIG. 11 with reference to curve S1, wherein $H_c$ represents the positive crossing of the H axis and $-H_c$ represents the negative crossing of the H axis, it may appear that in certain instances the absolute values of $H_c$ and $-H_c$ are not equivalent. The apparent difference can arise from a bias field, such as can be caused by the earth's magnetic field or a drive circuit having a DC offset. Alternatively, if the drive current is not sufficiently large, a so-called minor hysteresis loop may be produced. A minor hysteresis loop need not be symmetric as are the major loops illustrated in FIG. 11. Under these circumstances, the positive and negative current pulses produced within the receiving coils 29 will not occur at an equal time interval following the initiation of the magnetic pulse.

A magnetic circuit is a structure comprising at least one element of ferromagnetic material, the circuit directing and shaping the paths of magnetic flux. The simplest such circuit is a single piece of magnetic material such that the flux lines emerging from the material either terminate at external magnetic poles or close through free space. More complicated magnetic circuits involve a plurality of pieces of magnetic material, with the flux lines traversing the air gaps separating the various pieces. Magnetomotive forces may be applied to a magnetic circuit either by incorporating permanent magnets in the circuit or by imposing magnetic fields produced by the flow of electrical current through windings. For the latter, windings are generally disposed to encircle at least one of the elements of the magnetic circuit.

The magnetic reluctance of a magnetic circuit is a measure of the difficulty if causing a magnetic flux to traverse the circuit. The reluctance of a circuit is dependent both on the inherent magnetic properties of the materials used for the elements of the circuit and on the geometrical configuration of those elements. Materials for use in the magnetic circuit of the invention should have high permeabilities to minimize reluctance. The geometrical configuration should be such as to minimize the demagnetizing fields of the circuit. If the magnetostrictive, soft ferromagnetic sensing element of the strain gage is subjected to demagnetizing fields, its B-H loop will be sheared in a manner known in the art. A material having a sheared B-H loop exhibits transitions between the positively and negatively magnetized states which are less abrupt than those characteristic of a material with a non-sheared loop. The resulting voltage pulses induced in secondary coils during operation of the strain gage are broader, making it more difficult to time accurately the peaks of the voltage waveform, thereby reducing the resolution and sensitivity of the strain gage. A magnetic material having a sheared B-H loop also must be driven by a higher magnetic field to insure full alignment of the magnetization within the material, thus necessitating use of more complicated drive means.

Bodies of magnetic material having the form of wire, ribbon, strip, and the like are described in the terminology of mathematical topology as being simply connected. Shapes of material which are not simply connected are also useful in the practice of this invention. Examples of such shapes, which are also termed multiply connected shapes, include annular rings and picture frame shapes, understood to be those shapes which are generally rectangular and have a rectangular cutout therein. A body having a multiply connected shape inherently has at least one aperture in it.

The present invention may be practiced using a magnetic circuit having only one magnetic element. A preferred class of magnetic circuit having a single magnetic element consists of magnetic circuits with a single simply connected, elongated element. An elongated body is one having a long dimension much longer than either of the dimensions in the directions orthogonal to the long dimension. Preferably, the longest dimension is at least about 20 times, and more preferably, at least about 100–1000 times the square root of the cross-sectional area of the body, the cross-section being taken through a plane perpendicular to the longest dimension. These requirements on the geometry of the magnetic element insure that the element have a small or negligible demagnetizing factor along the long dimension. For use in the strain gage of the invention, the elongated magnetic element should be mounted with its long dimension along the axis on which it is desired to measure strain.

A more preferred class of magnetic circuit having a single magnetic element consists of circuits having a single multiply connected element. A multiply connected magnetic element advantageously maximizes containment of magnetic flux paths within the element, thereby at least reducing, and preferably eliminating, the termination of flux paths on the bounding surface of the magnetic element. Flux paths which terminate at a bounding surface of a magnetic element inherently give rise to demagnetizing fields generated by free magnetic poles on that surface. For example, magnetic flux in a high permeability annular ring generally follow a circular path coaxial with, and contained within, the ring. An analogous path is followed by flux in a picture frame shape such as that 42 of FIG. 3. More complicated multiply connected shapes are also preferred, such as the double frame shape 62 illustrated in FIG. 4. For the rectangular shape 42 of FIG. 3 it is preferred that the magnetic element be elongated, with the length being at least about 10 times the width. The long direction would be mounted along the axis on which it is desired to measure strain.

Figure 3:
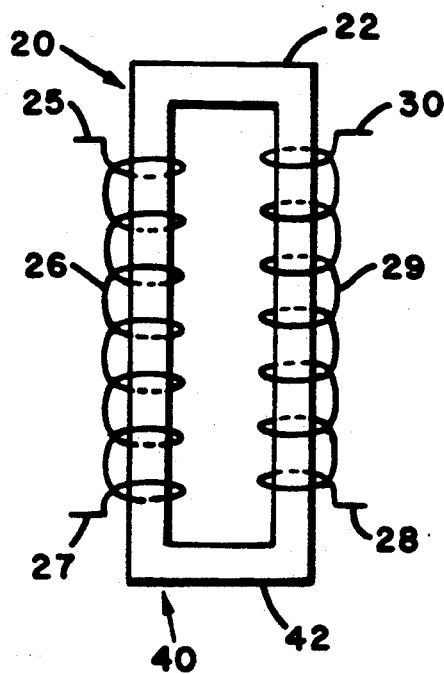
FIG. 3 is a schematic diagram of a magnetic strain gage of the invention having a simply-connected, magnetostrictive, soft ferromagnetic element of picture-frame shape.
Figure 4:
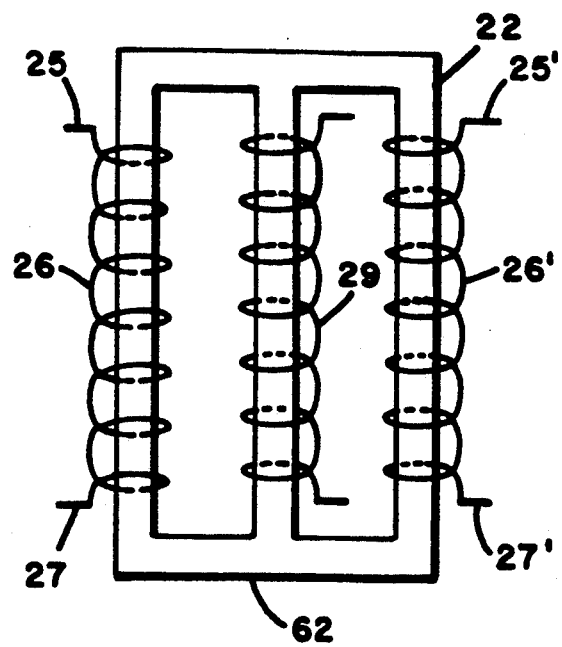
FIG. 4 is a schematic diagram of a magnetic strain gage of the invention having a multiply-connected, magnetostrictive, soft ferromagnetic element of double picture-frame shape.

The drive and pickup coils for a multiply connected magnetic element are conveniently wound by threading wires through the aperture or apertures therein. The coils of FIGS. 3 and 4 illustrate this practice. The passage of an electrical current through drive coil 26 produces a magnetomotive force in the circuit 40 of FIG. 3 and, thus, magnetic flux along lines generally following the picture frame shape 42 and contained therein.

Multiply connected magnetic circuit elements have the further advantage of combining a very small or negligible demagnetizing factor for being magnetized within the element but a much larger demagnetizing factor for excitation by external fields. As described above, passage of current through coil 26 of FIG. 3 produces magnetization with at most a small demagnetizing effect. Any external, extraneous fields (including earth's field) to which the strain gage 20 of FIG. 3 is exposed are subject to a much larger demagnetizing effect, minimizing the effect of the extraneous field. The strain gage of FIG. 3 or FIG. 4 or other strain gage of the invention employing a suitable multiply connected magnetic element is thereby rendered more immune to the effects of external fields than certain gages having only a simply connected magnetic element.

Multiply-connected magnetic circuit elements for use in the present invention are conveniently produced from ribbons or sheets of magnetic material by mechanical operations such as punching, stamping, and the like. Alternatively, shapes may be produced by chemical or electrochemical etching of starting ribbon or sheet material. A mask having the requisite shape of the desired element and being resistant to attack by the etchant may be deposited by photolithographic deposition on a sheet of the soft ferromagnetic material from which the element is formed. The deposition is typically accomplished by techniques known in the art. The shape would then be formed by etching away the material outside the desired shape. Multiply-connected elements may also be deposited on a substrate by evaporation, sputtering, magnetron sputtering, reactive sputtering, chemical vapor deposition, or other forms of atomistic deposition known in the art.

The advantages described above for strain gages employing a continuous, single, multiply-connected magnetic element may also be realized at least in part by use of magnetic circuits employing a plurality of soft ferromagnetic circuit elements disposed in arrangements simulating multiply-connected shapes. Examples of such geometries are shown in FIGS. 5–8. The elements of these circuits should be disposed so as to minimize demagnetizing effects in the circuits by minimizing the gaps of non-magnetic material or air between the ends of nearly contiguous elements. By making the gaps sufficiently small the reluctance of the entire magnetic circuit is not increased appreciably. Such magnetic circuits may employ both magnetostrictive and non-magnetostrictive elements. The lack of magnetostriction renders a material magnetically insensitive to externally imposed strains. A variety of non-magnetostrictive, soft ferromagnetic materials are known in the art, including certain permalloys, sendust alloys (e. g., Fe-10 wt.%Si-5 wt.%Al), and Co-based metallic glasses. The latter, especially non-magnetostrictive Co-based, boron and silicon containing metallic glasses, are preferred for use in strain gages required to operate under high strains. A non-magnetostrictive, soft ferromagnetic element may be employed for flux closure element 70 of the magnetic circuit 68 illustrated in FIG. 5. The use of a flux closure element 70 reduces the demagnetizing factor of circuit 68 of FIG. 4.

The magnetic strain gage of FIG. 5 employs one drive coil 26 and, optionally, a second drive coil 26'. If present, drive coil 26' should be connected, using drive coil leads 25' and 27' of coil 26', to drive coil 26 in series aiding to produce an enhanced magnetomotive force driving lines of magnetic flux through the center leg of element 22 which induce voltage in sense coil 29.

Figure 6:
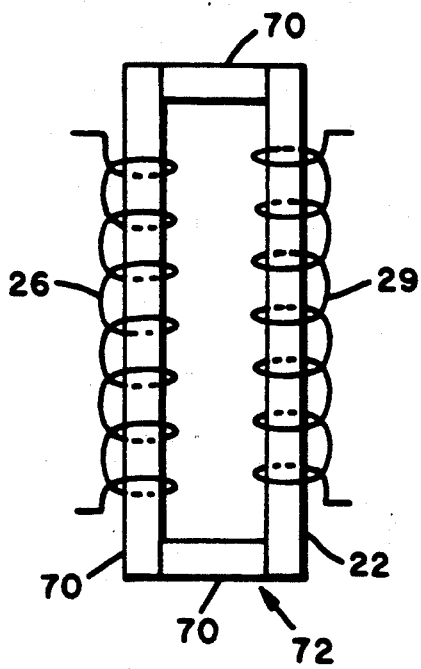
FIG. 6 is a schematic diagram of a magnetic strain gage of the invention having a magnetostrictive soft ferromagnetic element and a plurality of soft ferromagnetic flux closure elements.
Figure 7:
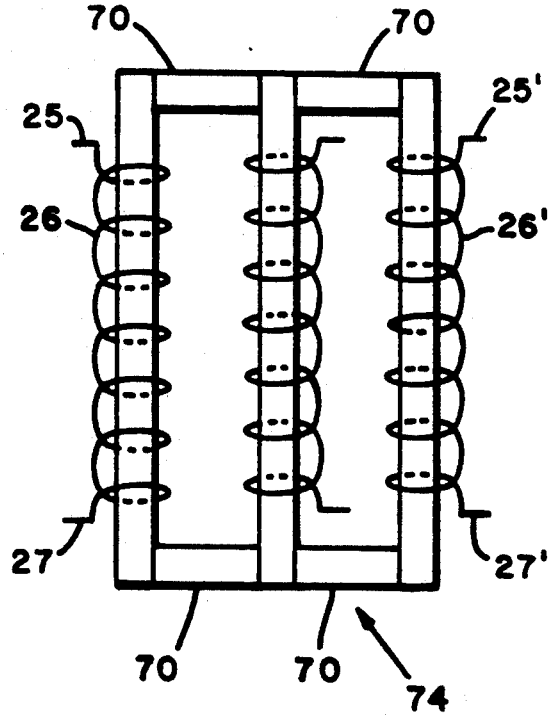
FIG. 7 is a schematic diagram of a magnetic strain gage of the invention having a plurality of magnetostrictive, soft ferromagnetic elements and a plurality of soft ferromagnetic flux closure elements.

The magnetic strain gage of FIG. 6 comprises a plurality of soft ferromagnetic flux closure elements 70 in magnetic circuit 72. Drive coil 26 is wound encircling at least one of flux closure elements 70. The magnetic strain gage of FIG. 7 comprises a plurality of soft ferromagnetic flux closure elements and a plurality of magnetostrictive soft ferromagnetic elements in magnetic circuit 74.

Figure 8:
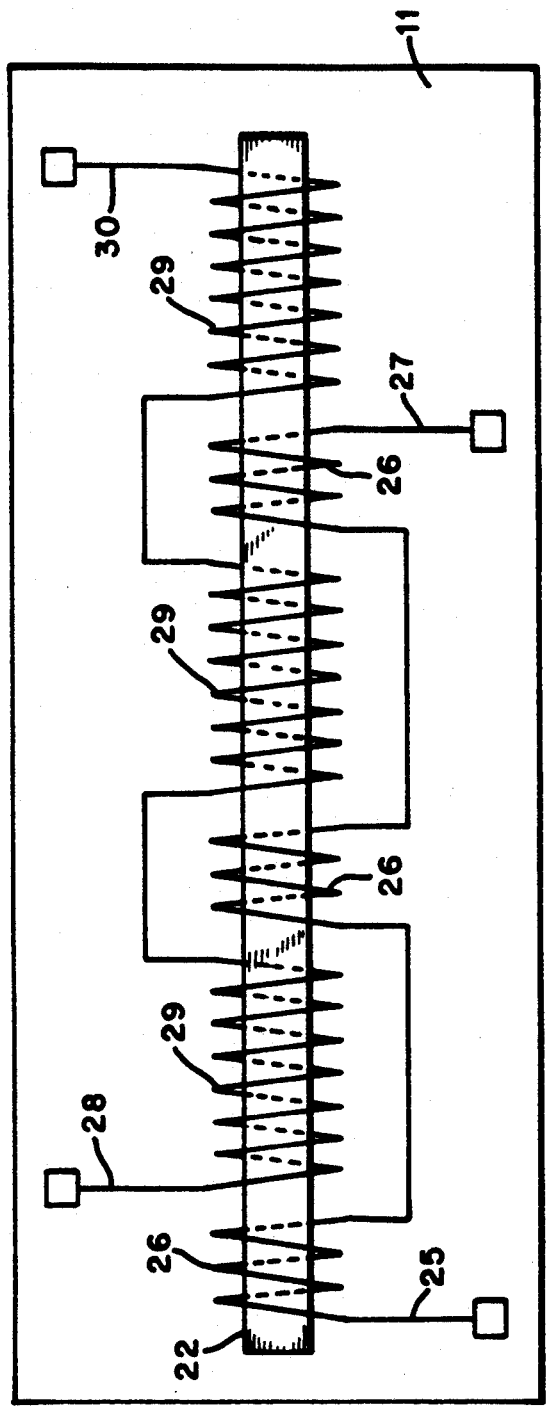
FIG. 8 is a schematic diagram of a magnetic strain gage of the invention having a magnetostrictive, soft ferromagnetic element and a plurality of drive and sense coil windings.
Figure 9:
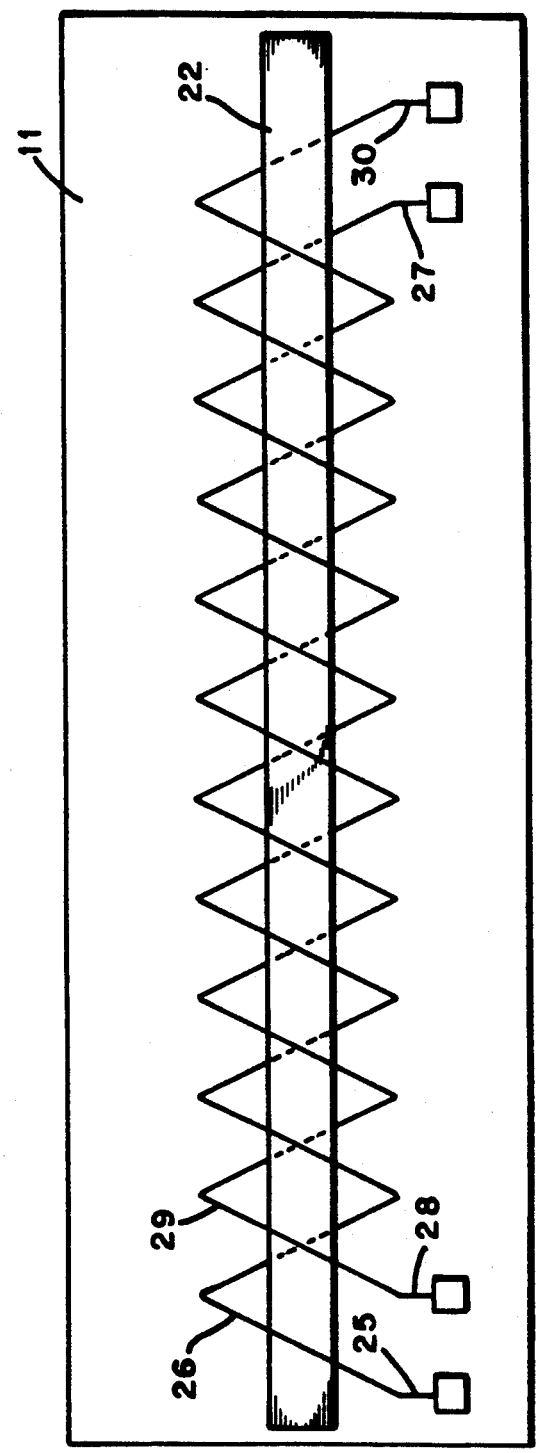
FIG. 9 is a schematic diagram of a magnetic strain gage of the invention having a magnetostrictive, soft ferromagnetic element and interwound drive and sense coil windings.

FIG. 8 depicts a magnetic strain gage of the invention comprising a simply connected magnetostrictive soft ferromagnetic element 22, a plurality of segments of drive coil windings 26, and a plurality of segments of sense coil windings 29 interspersed between segments of drive coil windings 26. FIG. 9 depicts a magnetic strain gage of the invention comprising a simply connected magnetostrictive soft ferromagnetic element 22, a plurality of turns of drive coil windings 26, and a plurality of turns of sense coil windings 29, the drive and sense coil windings being co-wound. The configurations of FIGS. 8 and 9 advantageously maximize the magnetic coupling between drive coil windings 26 and sense coil windings 29. Both configurations are especially suitable for fabrication using the thin-film techniques disclosed in the aforesaid copending application Ser. No. 136,268. The configuration of FIG. 8 conveniently allows the number of turns of drive coil windings 26 and of sense coil windings 29 to be unequal.

The strain gage of the invention comprises a magnetic circuit, drive means for applying a first and a second magnetomotive force to the magnetic circuit, the second magnetomotive force having a direction opposite that of the first magnetomotive force; sensing means for sensing the state of magnetization of the magnetostrictive, soft ferromagnetic element; detecting means for determining the magnitude of that magnetic field applied to the magnetostrictive, soft ferromagnetic element by that second magnetomotive force which is sufficient to reduce the magnetization of the magnetostrictive, soft ferromagnetic element to zero.

The magnetic circuit comprises at least one element which is a magnetostrictive, soft ferromagnetic material. Preferably the drive means comprises a drive coil of at least one electrical winding encircling an element of the magnetic circuit, the drive coil being connected to a source of cyclic, alternating electrical current. The sensing means is preferably at least one electrical winding which encircles an element of the magnetic circuit and is connected to signal processing circuitry. Generally the coils will have multiple turns of windings. The wire size for the drive coil must be large enough to pass the needed current without excessive heating. In contrast, the current flowing in the sense coil is minimal, the coil being a voltage source. Hence, the sense coil can be many turns of fine wire.

A particularly attractive aspect of the present invention is its compatibility with digital signal processing techniques. The coercivity of the sensing element can be sensed in the time domain by noting that the voltage peaks in the sense coil occur at the time at which the applied field attains values of plus and minus the coercive field. A change in coercivity of the sensing element is therefore sensed by noting the change in time at which the voltage peaks occur. The applied field is produced most conveniently by passing a cyclic alternating current through drive coil winding 26. Upon application of stress, the shift in coercive field gives rise to a shift in the phase of the peaks in the sense coil voltage waveform, measured relative to the phase of the drive current waveform, to hence the phase of the drive field waveform field. The phase shift can be measured by digital electronic timing circuitry which senses the peak positions of the sense coil waveform and times them relative to the drive coil phase as depicted in FIG. 10. It will be appreciated that a constant amplitude and frequency of drive excitation must be maintained for a meaningful, direct comparison without correction techniques.

The method of measuring strain within a substrate of the present invention comprises: attaching a magnetic circuit to the substrate, the magnetic circuit comprising a magnetostrictive, soft ferromagnetic element; and sensing a change in the coercive field of the magnetostrictive, soft ferromagnetic element caused by strain within the element.

Preferably, the coercive field is measured by a method comprising of the steps of: applying a first magnetomotive force to the magnetic circuit, the first magnetomotive force having sufficient magnitude to reverse the direction of magnetization of a majority of the volume of the magnetostrictive, soft ferromagnetic element; removing the first magnetomotive force; applying a second magnetomotive force having a sense opposite that of the first magnetomotive force while sensing the magnetization of the magnetostrictive, soft ferromagnetic element; increasing the magnitude of the second magnetomotive force to a magnitude at least sufficient to reduce the magnetization of the magnetostrictive, soft ferromagnetic element to zero; and sensing the change in magnetic field applied to the magnetostrictive, soft ferromagnetic element by that magnetomotive force which reduces the magnetization of the magnetostrictive, soft ferromagnetic element to zero caused by strain within the element.

Figure 12:
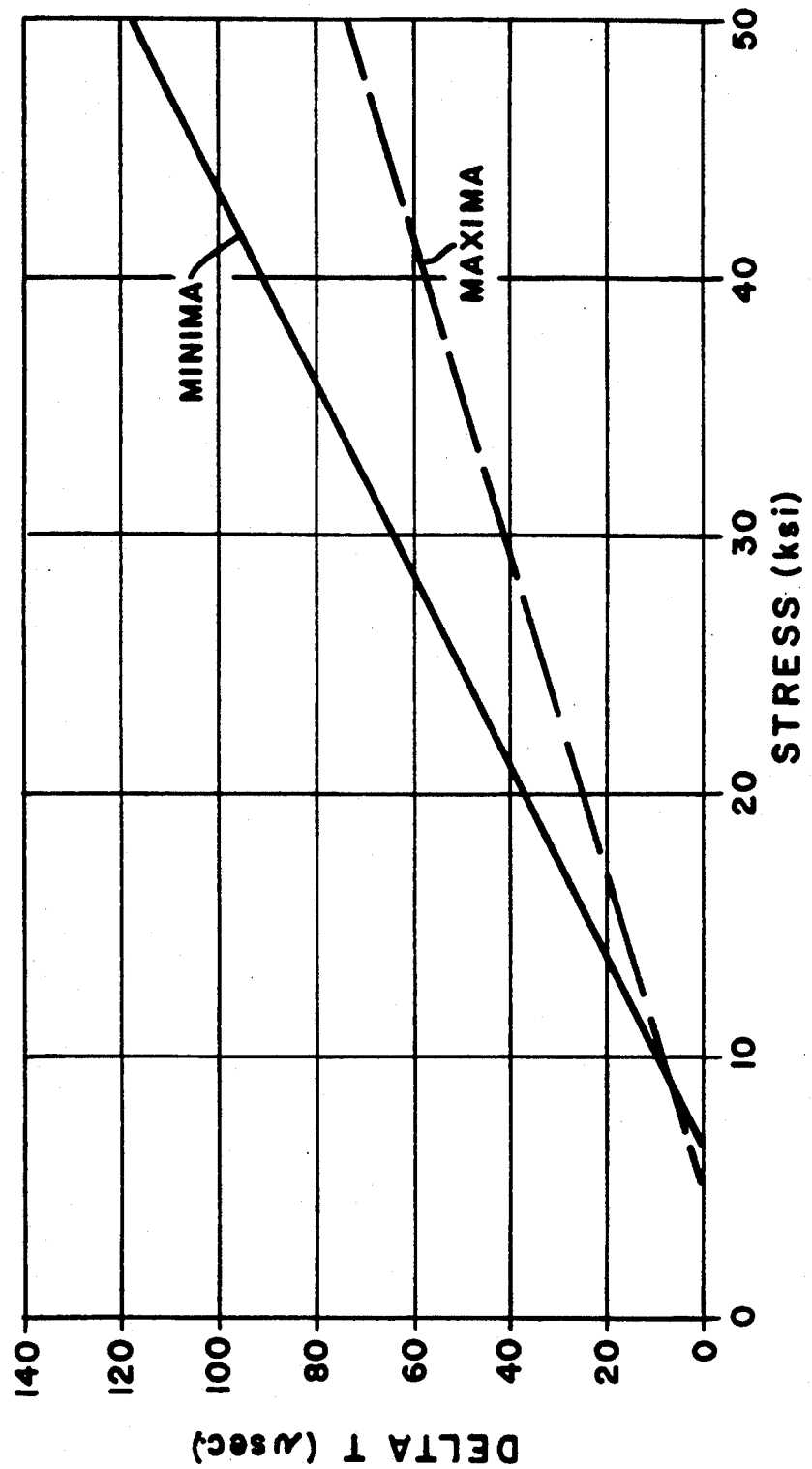
FIG. 12 is a graph showing a change in the Phase of induced voltage pulses as a function of stress for the magnetic strain gage of FIG. 2.

FIG. 12 is a graph showing stress (ksi) vs. $\Delta T$ in microseconds for a test apparatus. In the test apparatus, the element 22 had to be placed under a reference stress, $T_0$ was set at the reference stress, resulting in the offset along the X axis. The two lines, labeled maxima and minima, represent measurements taken from respectively, the positive pulses of FIG. 5 for maxima and the negative pulses of FIG. 5 for the minima. These two lines illustrate the case of an amorphous metal in which the apparent absolute values of $H_c$ and $-H_c$ are not equivalent, as described above. As illustrated graphically in FIG. 12, the stress vs. time plot is a straight line. It is also contemplated that the entire magnetic strain gage 20 could be miniaturized, down to the scale wherein the conductive element 22 is only a few magnetic domains in length.

Having thus described the invention in rather full detail, it will be understood that this detail need not be strictly adhered to but that various changes and modifications may suggest themselves to one skilled in the art all falling within the scope of the present invention as defined by the sustained claims.

What is claimed is:

1. A method of measuring strain within a substrate comprising the steps of:

i. attaching a magnetic circuit to said substrate, said magnetic circuit comprising a magnetostrictive, soft ferromagnetic element adapted to produce a coercive force in the presence of an applied magnetic field;

ii. sensing a change in the coercive field of said ferromagnetic element caused by strain therewithin, said change in said coercive field being measured by a method comprising the steps of:

(a) applying a first magnetomotive force to said magnetic circuit, said magnetomotive force having sufficient magnitude to reverse the direction of magnetization of a majority of the volume of said ferromagnetic element;

(b) removing said first magnetomotive force;

(c) applying a second magnetomotive force to said magnetic circuit in a direction opposite to that of said first magnetomotive force while sensing the magnetization of said ferromagnetic element, said first and second magnetomotive forces being applied by passing an alternating electrical current through a drive coil of at least one turn of winding enclosing an element of said magnetic circuit;

(d) increasing the magnitude of said second magnetomotive force to a magnitude at least sufficient to reduce the magnetization of said ferromagnetic element to zero; and (e) determining the change in magnetic field applied to said ferromagnetic element by that magnetomotive force which reduces magnetization of said ferromagnetic element to zero caused by strain therewithin, said magnetization of said ferromagnetic element being sensed using a sense coil of at least one turn of winding enclosing an element of said magnetic circuit and said change in magnetic field of said ferromagnetic element being determined by sending a change in the time for the occurrence of voltage peaks in said sense coil, said time being measured relative to the waveform of said alternating electrical current, said change in time being a measure of said coercive field.

* * * * *